United States Patent
Nordbruch

(10) Patent No.: US 10,741,080 B2
(45) Date of Patent: Aug. 11, 2020

(54) METHOD AND DEVICE FOR OPERATING A MOTOR VEHICLE TRAVELING DRIVERLESSLY WITHIN A PARKING AREA

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 277 days.

(21) Appl. No.: 15/757,402

(22) PCT Filed: Jul. 15, 2016

(86) PCT No.: PCT/EP2016/066866
§ 371 (c)(1),
(2) Date: Mar. 5, 2018

(87) PCT Pub. No.: WO2017/041941
PCT Pub. Date: Mar. 16, 2017

(65) Prior Publication Data
US 2018/0240343 A1 Aug. 23, 2018

(30) Foreign Application Priority Data
Sep. 11, 2015 (DE) .......................... 10 2015 217 388

(51) Int. Cl.
| | |
|---|---|
| *B60W 30/06* | (2006.01) |
| *B60W 30/09* | (2012.01) |
| *B60W 30/095* | (2012.01) |
| *G05D 1/02* | (2020.01) |
| *G08G 1/04* | (2006.01) |
| *G08G 1/16* | (2006.01) |

(52) U.S. Cl.
CPC ............ *G08G 1/166* (2013.01); *B60W 30/06* (2013.01); *B60W 30/09* (2013.01);
(Continued)

(58) Field of Classification Search
CPC .. B60W 30/0956; B60W 30/06; B60W 30/09; B60W 2556/45; B60W 2554/00;
(Continued)

(56) References Cited

U.S. PATENT DOCUMENTS

| | | | |
|---|---|---|---|
| 2012/0053827 A1* | 3/2012 | Harada | G05D 1/024 701/301 |
| 2013/0085637 A1* | 4/2013 | Grimm | G05D 1/00 701/25 |

(Continued)

FOREIGN PATENT DOCUMENTS

| | | |
|---|---|---|
| DE | 102012016867 A1 | 9/2013 |
| DE | 102012203235 A1 | 9/2013 |

(Continued)

OTHER PUBLICATIONS

International Search Report dated Nov. 7, 2016, of the corresponding International Application PCT/EP2016/066866 filed Jul. 15, 2016.
(Continued)

*Primary Examiner* — Behrang Badii
*Assistant Examiner* — Hossam M Abd El Latif
(74) *Attorney, Agent, or Firm* — Norton Rose Fulbright US LLP; Gerard Messina

(57) ABSTRACT

A method for operating a motor vehicle driving driverlessly within a parking facility, including detecting, by way of a surrounding-area sensor suite of the motor vehicle, a surrounding area of the motor vehicle, in order to ascertain surrounding-area data corresponding to the detected surrounding area; checking motor vehicle-internally, based on the ascertained surrounding-area data, whether the surrounding area of the motor vehicle is devoid of an object that might, with a predetermined probability, collide with the motor vehicle; and continuing driverless driving only when the motor vehicle-internal check has indicated that the surrounding area of the motor vehicle is devoid of a corresponding object, so that the motor vehicle automatically halts if the motor vehicle-internal check has indicated that a corresponding object is located in the surrounding area.

23 Claims, 4 Drawing Sheets

(52) U.S. Cl.
CPC ......... *B60W 30/0956* (2013.01); *G05D 1/028* (2013.01); *G05D 1/0214* (2013.01); *G05D 1/0238* (2013.01); *G05D 1/0274* (2013.01); *G08G 1/04* (2013.01); *G08G 1/164* (2013.01); *G08G 1/168* (2013.01); *B60W 2554/00* (2020.02); *B60W 2556/45* (2020.02); *G05D 2201/0213* (2013.01)

(58) Field of Classification Search
CPC .... G05D 1/0238; G05D 1/0214; G05D 1/028; G05D 1/0274; G05D 2201/0213; G08G 1/166; G08G 1/164; G08G 1/04; G08G 1/168
USPC .......................................................... 701/23
See application file for complete search history.

(56) References Cited

U.S. PATENT DOCUMENTS

2014/0336912 A1* 11/2014 Pink ...................... B60W 40/04 701/117
2015/0286219 A1* 10/2015 Reichel .................. G08G 1/162 701/23
2015/0353080 A1* 12/2015 Mukaiyama ............ E05B 77/54 701/23
2017/0008400 A1* 1/2017 Katsuta .................... B60K 6/48

FOREIGN PATENT DOCUMENTS

| | | |
|---|---|---|
| DE | 102012021282 A1 | 4/2014 |
| DE | 102012222562 A1 | 6/2014 |
| DE | 102014218429 A1 | 3/2016 |
| EP | 2695797 A2 | 2/2014 |
| WO | 2016134827 A1 | 9/2016 |

OTHER PUBLICATIONS

Kyounghwan an et al: "Cooperative vehicle control system based on fusion map", Computing and Convergence Technology (ICCCT), 2012 7th International Conference on, IEEE, Dec. 3, 2012 (Dec. 3, 2012), pp. 94-97, XP032421998, ISBN: 978-1-4673-0894-6.

* cited by examiner

# METHOD AND DEVICE FOR OPERATING A MOTOR VEHICLE TRAVELING DRIVERLESSLY WITHIN A PARKING AREA

FIELD

The present invention relates to a method and an apparatus for operating a motor vehicle driving driverlessly within a parking facility. The invention further relates to a motor vehicle. The present invention additionally relates to a method and an apparatus for operating a parking facility. The present invention additionally relates to a parking facility for motor vehicles. The present invention relates to a computer program.

BACKGROUND INFORMATION

German Application DE 10 2012 222 562 A1 describes a system for managed parking areas, for transferring a vehicle from a starting position to a destination position.

In fully automated (autonomous) "valet parking," a motor vehicle is parked by its driver at a dropoff location, for example in front of a parking garage, and the motor vehicle drives itself from there into a parking position/parking bay and back again to the dropoff location.

In the context of so-called fully automated valet parking, it is important that the autonomously driving motor vehicle not cause any accidents, for example that it not collide with an object that is located within the parking facility.

SUMMARY

An object on which the present invention is to efficiently reduce a risk of accident or collision for a motor vehicle driving driverlessly within a parking facility.

Advantageous embodiments of the present invention are described herein.

According to one aspect of the present invention, a method for operating a motor vehicle driving driverlessly within a parking facility is provided, including the following steps:

detecting, by way of a surrounding-area sensor suite of the motor vehicle, a surrounding area of the motor vehicle, in order to ascertain surrounding-area data corresponding to the detected surrounding area;

checking motor vehicle-internally, based on the ascertained surrounding-area data, whether the surrounding area of the motor vehicle is devoid of an object that might, with a predetermined probability, collide with the motor vehicle; and continuing driverless driving only when the motor vehicle-internal check has indicated that the surrounding area of the motor vehicle is devoid of a corresponding object, so that the motor vehicle automatically halts if the motor vehicle-internal check has indicated that a corresponding object is located in the surrounding area.

According to a further aspect of the present invention, an apparatus for operating a motor vehicle driving driverlessly within a parking facility is provided, including:

a surrounding-area sensor suite for detecting a surrounding area of the motor vehicle in order to ascertain surrounding-area data corresponding to the detected surrounding area;

a checking device for checking, based on the ascertained surrounding-area data, whether the surrounding area of the motor vehicle is devoid of an object that might, with a predetermined probability, collide with the motor vehicle; and a guidance device for driverlessly guiding the motor vehicle, the guidance device being embodied to continue driverless driving only when the check has indicated that the surrounding area of the motor vehicle is devoid of a corresponding object, the guidance device being embodied to automatically halt the motor vehicle if the check has indicated that a corresponding object is located in the surrounding area.

According to a further aspect of the present invention, a motor vehicle that encompasses the apparatus for operating a motor vehicle driving driverlessly within a parking facility is provided.

According to another aspect of the present invention, a method for operating a parking facility is provided, encompassing the following steps:

detecting, by way of a surrounding-area sensor suite of the parking facility, a surrounding area of a motor vehicle driving driverlessly within the parking facility, in order to ascertain surrounding-area data corresponding to the detected surrounding area;

checking by way of a checking device of the parking facility, based on the ascertained surrounding-area data, whether the surrounding area of the motor vehicle is devoid of an object that might, with a predetermined probability, collide with the motor vehicle; and transmitting to the motor vehicle via a communication network, by way of a communication interface of the parking facility, a release signal for a route segment located ahead of the motor vehicle, if the check has indicated that the surrounding area of the motor vehicle is devoid of a corresponding object.

In accordance with a further aspect of the present invention, an apparatus for operating a parking facility is provided, encompassing:

a surrounding-area sensor suite for detecting a surrounding area of a motor vehicle driving driverlessly within the parking facility, in order to ascertain surrounding-area data corresponding to the detected surrounding area;

a checking device for checking, based on the ascertained surrounding-area data, whether the surrounding area of the motor vehicle is devoid of an object that might, with a predetermined probability, collide with the motor vehicle; and a communication interface for transmitting to the motor vehicle, via a communication network, a release signal for a route segment located ahead of the motor vehicle, if the check has indicated that the surrounding area of the motor vehicle is devoid of an object.

According to another aspect of the present invention, a parking facility for motor vehicles is provided, the parking facility encompassing the apparatus for operating a parking facility.

In accordance with yet another aspect of the present invention, a computer program that encompasses program code for carrying out the method for operating a motor vehicle driving driverlessly within a parking facility and/or for carrying out the method for operating a parking facility, when the computer program is executed on a computer, is provided.

The present invention encompasses, in particular and inter alia, that the driverlessly driving motor vehicle continues driverlessly driving only when a vehicle-internal check has indicated that the surrounding area of the motor vehicle is devoid of an object that might, with a predetermined probability, collide with the vehicle. This brings about in particular the technical advantage that an accident risk or collision risk for a motor vehicle driving driverlessly within a parking facility can be efficiently decreased.

The present invention therefore further encompasses, in particular and inter alia, that a check is made vehicle-externally as to whether a surrounding area of a motor vehicle that is driving driverlessly within a parking facility is devoid of an object that might, with a predetermined probability, collide with the motor vehicle. If the check has indicated that no corresponding object is located in the surrounding area, i.e., that the surrounding area is devoid of such an object, a release signal for a route segment located ahead of the vehicle is transmitted to the motor vehicle via a communication network by way of a communication interface. The motor vehicle thus, advantageously, efficiently receives information that the road segment ahead is devoid of an object that might, with a predetermined probability, collide with the motor vehicle.

Based on this information the motor vehicle can, advantageously, efficiently decide further whether to continue driverlessly driving or to halt. This also brings about the technical advantage that a risk of collision or accident for the motor vehicle is efficiently decreased.

The technical advantage brought about in general is that safety for traffic participants within the parking facility can be enhanced.

The fact that the vehicle is "driving driverlessly" means or signifies that the vehicle is not being controlled or guided by a human driver or human vehicle operator. Driverless driving encompasses, for example, the fact that the vehicle is remotely controlled. This means, for example, that remote control commands are transmitted to the vehicle. Driverless driving encompasses, for example, the fact that the vehicle is driving autonomously, i.e., unassistedly. Mixed forms are provided, for example, meaning that the vehicle is remotely controlled over one route segment and drives autonomously on another route segment.

Provision is made, for example, that a destination position within the parking facility is conveyed to the motor vehicle, the motor vehicle then driving autonomously, i.e., unassistedly, to that destination position. The motor vehicle navigates to the destination position, for example, based on a digital map of the parking facility. That digital map is conveyed to the motor vehicle, for example, via a communication network. In general, for example, information that is relevant for autonomous driving within the parking facility is conveyed to the motor vehicle via the communication network. Based on that information the motor vehicle then drives autonomously within the parking facility, in particular to the destination position. Such information encompasses, for example: positions of further motor vehicles, speed data for further motor vehicles, a target trajectory to be traversed by the motor vehicle.

A "communication network" for purposes of the present invention encompasses in particular a WLAN communication network and/or a mobile radio network and/or a communication network in accordance with the low power wide-range (LoRa) communication standard. According to an embodiment, the communication network therefore encompasses a LoRa communication network.

In another embodiment, a communication via the communication network becomes and/or is encoded.

"Vehicles" for purposes of the present invention are motor vehicles.

According to an embodiment, a surrounding-area sensor suite (of the parking facility and/or of the motor vehicle) encompasses one or more surrounding-area sensors. A surrounding-area sensor is, for example, one of the following surrounding-area sensors: video sensor, laser sensor, ultrasonic sensor, lidar sensor, magnetic sensor, or radar sensor.

A "parking facility" for purposes of the present invention can be referred to as a "parking area," and serves as an area for parking vehicles. The parking facility thus constitutes a contiguous area that has several parking locations (for a parking facility on private property) or parking spaces (for a parking facility on public property). According to an embodiment, the parking facility is embodied as a parking structure. According to an embodiment, the parking facility is embodied as a parking garage.

In another embodiment of the present invention, provision is made that the surrounding-area sensor suite encompasses several surrounding-area sensors, detection of the surrounding area encompassing the fact that by way of the several surrounding-area sensors, the respective surrounding area is detected in order to ascertain surrounding-area data corresponding to the respective detected surrounding area, the motor vehicle-internal check encompassing the fact that, based on the respective ascertained surrounding-area data, a respective check is made motor vehicle-internally as to whether the surrounding area of the motor vehicle is devoid of an object that might, with a predetermined probability, collide with the motor vehicle, driverless driving being continued only when each respective motor vehicle-internal check has indicated that the surrounding area of the motor vehicle is devoid of a corresponding object, so that the motor vehicle automatically halts if at least one respective motor vehicle-internal check has indicated that a corresponding object is located in the surrounding area.

This brings about in particular the technical advantage that any malfunctions of a surrounding-area sensor do not lead to the incorrect conclusion that the surrounding area is devoid of a corresponding object. This is because in order for the motor vehicle to continue driving driverlessly, each check must indicate, based on the respective surrounding-area data, that the surrounding area is devoid of a corresponding object. A sensor malfunction that causes the check to indicate incorrectly that the surrounding area is devoid of an object thus no longer results in a continuation of driverless driving if, at the same time, the other surrounding-area sensors are functioning properly and the check has respectively indicated in this case that the surrounding area is not devoid of a corresponding object.

According to another embodiment, provision is made that a check is made motor vehicle-internally as to whether a release signal for a route segment located ahead of the motor vehicle has been received via a communication network by way of a communication interface of the motor vehicle, driverless driving being continued only when the release signal has been received, even if the motor vehicle-internal check has indicated that the surrounding area of the motor vehicle is devoid of a corresponding object.

This brings about in particular the technical advantage that a possible collision risk or accident risk for the motor vehicle can efficiently be reduced even further. This is because a vehicle-external apparatus must also additionally have decided that the surrounding area of the motor vehicle is devoid of a corresponding object. Only when both the vehicle-external check and the vehicle-internal check have come to the same conclusion
    that the surrounding area is devoid of a corresponding
        object is driverless driving of the motor vehicle, according to this embodiment, continued.

In another embodiment of the present invention, provision is made that prior to automatic halting of the motor vehicle a decision reason that resulted in the automatic halting is verified, so that the motor vehicle automatically halts only upon positive verification.

This brings about in particular the technical advantage that false-negative situations can be efficiently recognized. A "false-negative situation" refers to the case in which the surrounding area is in fact devoid of a corresponding object, but the check has incorrectly indicated that a corresponding object is located in the surrounding area of the motor vehicle. "Positive verification" means here that the motor vehicle halts only if the verification has indicated that the decision reason was correct, i.e., that upon a corresponding previous check, it was found that the surrounding area was not devoid of a corresponding object.

According to another embodiment, provision is made that the motor vehicle-internal check is time-synchronized with a motor vehicle-external check as to whether the surrounding area of the motor vehicle is devoid of an object that might, with a predetermined probability, collide with the motor vehicle.

This brings about in particular the technical advantage that the check can be carried out efficiently. For the time synchronization, according to an embodiment provision is made that synchronization signals are transmitted between the motor vehicle and the apparatus for operating a parking facility, in particular between the apparatus for operating a motor vehicle driving driverlessly within a parking facility and the apparatus for operating a parking facility. "Synchronization signals" are, for example, time signals or clock signals. The motor vehicle-internal check can thereby be coordinated in time with the motor vehicle-external check. It is thereby possible, for example, to prevent situations in which the motor vehicle itself has arrived at a result but must still wait for a result of the check on the part of the motor vehicle-external checking device, which might possibly result in delays in the operation of the motor vehicle.

In another embodiment, provision is made that the apparatus for operating a motor vehicle driving driverlessly within a parking facility is embodied or configured to execute or carry out the method for operating a motor vehicle driving driverlessly within a parking facility.

Technical functionalities of the apparatus for operating a motor vehicle driving driverlessly within a parking facility are evident analogously from corresponding technical functionalities of the method for operating a motor vehicle driving driverlessly within a parking facility, and vice versa.

According to an embodiment, provision is made that the method for operating a motor vehicle driving driverlessly within a parking facility is executed or carried out by way of the apparatus for operating a motor vehicle driving driverlessly within a parking facility.

According to an embodiment, provision is made that the motor vehicle is embodied or configured to execute or carry out the method for operating a motor vehicle driving driverlessly within a parking facility.

According to an embodiment, provision is made that the surrounding-area sensor suite encompasses several surrounding-area sensors for respectively detecting the surrounding area, in order to respectively ascertain surrounding-area data corresponding to the respective detected surrounding area, the checking device being embodied to respectively check, based on the respective ascertained surrounding-area data, whether the surrounding area of the motor vehicle is devoid of an object that might, with a predetermined probability, collide with the motor vehicle, the guidance device being embodied to continue driverless driving only when the respective check has indicated that the surrounding area of the motor vehicle is devoid of a corresponding object, the guidance device being embodied to automatically halt the motor vehicle if the respective motor vehicle-internal check has indicated that a corresponding object is located in the surrounding area.

In another embodiment, provision is made that a communication interface for receiving, via a communication network, a release signal for a route segment located ahead of the motor vehicle is provided, the checking device being embodied to check whether a corresponding release signal has been received via the communication network by way of the communication interface, the guidance device being embodied to continue driverless driving only when the release signal has been received, even if the check has indicated that the surrounding area of the motor vehicle is devoid of a corresponding object.

In a further embodiment, provision is made that the checking device is embodied to verify, prior to automatic halting of the motor vehicle, a decision reason that resulted in the automatic halting, the guidance device being embodied to automatically halt the motor vehicle only upon positive verification.

In another embodiment, provision is made that the checking device is embodied to time-synchronize the check with a further check by a further checking device as to whether the surrounding area of the motor vehicle is devoid of an object that might, with a predetermined probability, collide with the motor vehicle.

In a further embodiment, provision is made that the apparatus for operating a parking facility is embodied or configured to execute or carry out the method for operating a parking facility.

Technical functionalities of the method for operating a parking facility are evident analogously from corresponding technical functionalities of the apparatus for operating a parking facility, and vice versa.

According to an embodiment of the present invention, provision is made that the method for operating a parking facility is carried out by way of the apparatus for operating a parking facility.

According to an embodiment, provision is made that the check by way of the checking device of the parking facility is time-synchronized with a check by a motor vehicle-internal checking device as to whether the surrounding area of the motor vehicle is devoid of an object that might, with a predetermined probability, collide with the motor vehicle.

For purposes of the present invention, the checking device of the apparatus for operating a parking facility can be referred to as a "motor vehicle-external checking device." For purposes of the present invention, the checking device of the apparatus for operating a vehicle driving driverlessly within a parking facility can be referred to as a "motor vehicle-internal checking device." This applies analogously to the surrounding-area sensor suite and the communication interface. Here as well, the adjectives "motor vehicle-internal" and "motor vehicle-external" are used in accordance with the association with the apparatus for operating a parking facility and/or for operating a vehicle driving within a parking facility.

In a further embodiment, provision is made that the surrounding-area data of the several surrounding-area sensors (of the motor vehicle and/or of the parking facility) are fused in order to ascertain fused surrounding-area data, so that the motor vehicle-internal and/or -external check (for example, by way of the checking device of the parking facility) as to whether the surrounding area of the motor vehicle is devoid of an object that might, with a predetermined probability, collide with the motor vehicle is carried out based on the fused surrounding-area data.

The present invention is explained in further detail below with reference to preferred exemplifying embodiments.

DETAILED DESCRIPTION OF EXAMPLE EMBODIMENTS

Figure 1:
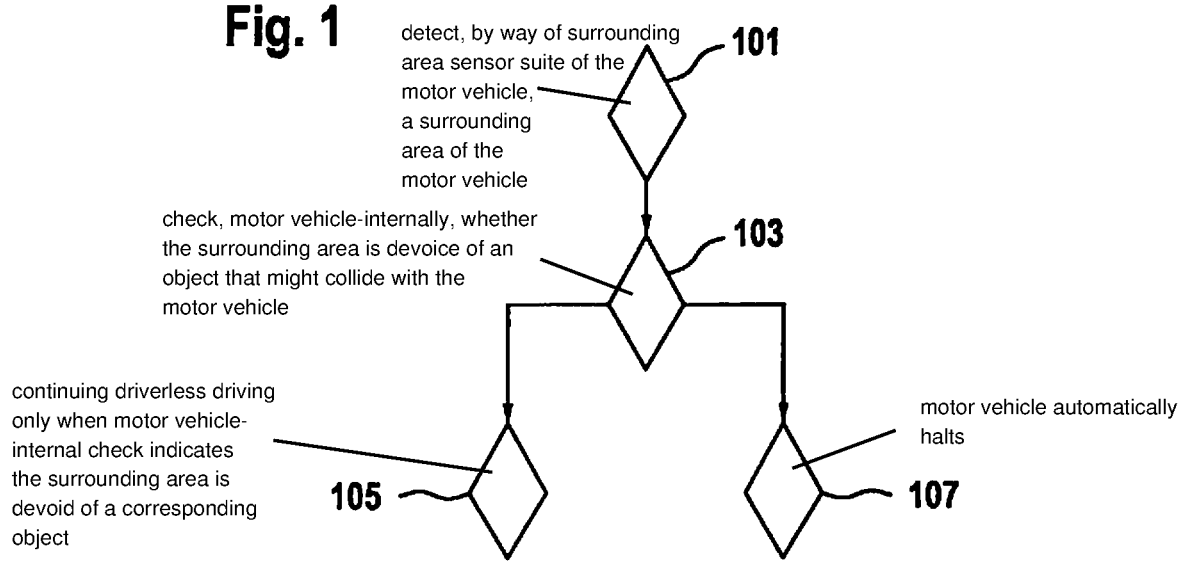
FIG. 1 is a flow chart of a method for operating a motor vehicle driving driverlessly within a parking facility.

FIG. 1 is a flow chart of a method for operating a motor vehicle driving driverlessly within a parking facility.

The method encompasses the following steps:
  detecting 101, by way of a surrounding-area sensor suite of the motor vehicle, a surrounding area of the motor vehicle, in order to ascertain surrounding-area data corresponding to the detected surrounding area;
  checking 103 motor vehicle-internally, based on the ascertained surrounding-area data, whether the surrounding area of the motor vehicle is devoid of an object that might, with a predetermined probability, collide with the motor vehicle; and
  continuing 105 driverless driving only when the motor vehicle-internal check has indicated that the surrounding area of the motor vehicle is devoid of a corresponding object, so that the motor vehicle automatically halts 107 if the motor vehicle-internal check has indicated that a corresponding object is located in the surrounding area.

Figure 2:
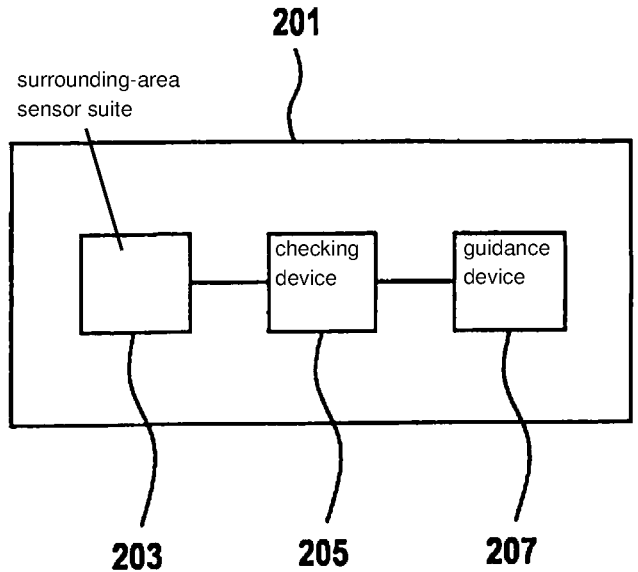
FIG. 2 shows an apparatus for operating a motor vehicle driving driverlessly within a parking facility.

FIG. 2 shows an apparatus 201 for operating a motor vehicle driving driverlessly within a parking facility.

Apparatus 201 encompasses:
  a surrounding-area sensor suite 203 for detecting a surrounding area of the motor vehicle in order to ascertain surrounding-area data corresponding to the detected surrounding area;
  a checking device 205 for checking, based on the ascertained surrounding-area data, whether the surrounding area of the motor vehicle is devoid of an object that might, with a predetermined probability, collide with the motor vehicle; and
  a guidance device 207 for driverlessly guiding the motor vehicle, guidance device 207 being embodied to continue driverless driving only when the check has indicated that the surrounding area of the motor vehicle is devoid of a corresponding object, guidance device 207 being embodied to automatically halt the motor vehicle if the check has indicated that a corresponding object is located in the surrounding area.

Surrounding-area sensor suite 203 encompasses, for example, one or several surrounding-area sensors.

Figure 3:
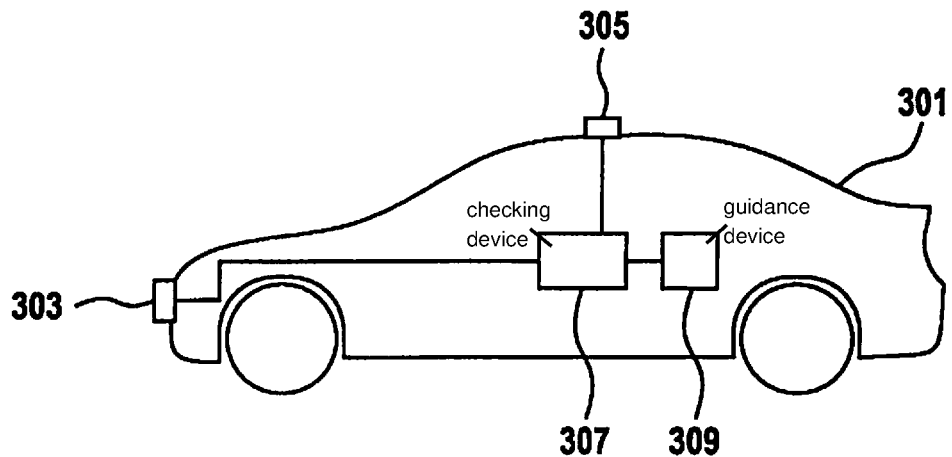
FIG. 3 shows a motor vehicle.

FIG. 3 shows a motor vehicle 301.

Motor vehicle 301 encompasses a radar sensor 303 and a video sensor 305 for respectively detecting a surrounding area of motor vehicle 301. Motor vehicle 301 furthermore encompasses a checking device 307 for checking, based on the surrounding-area data ascertained by way of surrounding-area sensors 303, 305, whether the surrounding area of motor vehicle 301 is devoid of an object that might, with a predetermined probability, collide with motor vehicle 301.

Motor vehicle 301 furthermore encompasses a guidance device 309 that is embodied in accordance with the present invention.

Motor vehicle 301 thus encompasses an apparatus for operating a motor vehicle driving driverlessly within a parking facility, that apparatus encompassing radar sensor 303 and video sensor 305 as a surrounding-area sensor suite.

Figure 4:
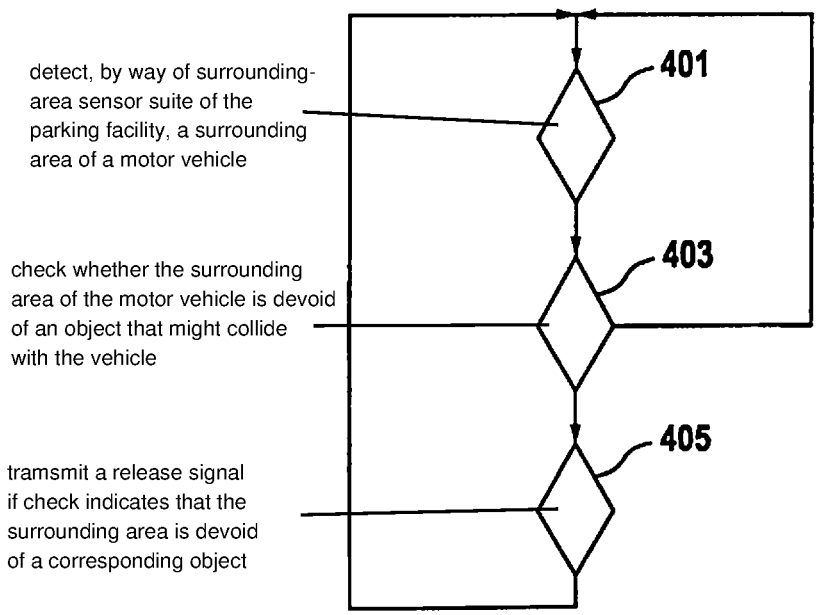
FIG. 4 is a flow chart of a method for operating a parking facility.

FIG. 4 is a flow chart of a method for operating a parking facility.

The method encompasses the following steps:
  detecting 401, by way of a surrounding-area sensor suite of the parking facility, a surrounding area of a motor vehicle driving driverlessly within the parking facility, in order to ascertain surrounding-area data corresponding to the detected surrounding area;
  checking 403 by way of a checking device of the parking facility, based on the ascertained surrounding-area data, whether the surrounding area of the motor vehicle is devoid of an object that might, with a predetermined probability, collide with the motor vehicle; and
  transmitting 405 to the motor vehicle via a communication network, by way of a communication interface of the parking facility, a release signal for a route segment located ahead of the motor vehicle, if the check has indicated that the surrounding area of the motor vehicle is devoid of a corresponding object.

If it is found, in the checking step in accordance with step 403, that the surrounding area of the motor vehicle is not devoid of a corresponding object, a release signal is then not generated and transmitted to the vehicle by way of the communication interface. Instead, the method then begins again with step 401.

In an embodiment that is not shown, provision is made that if it is found, in the checking step in accordance with step 403, that the surrounding area of the motor vehicle is not devoid of a corresponding object, an object signal is transmitted to the motor vehicle by way of the communication interface. An "object signal" is a signal that signals to the motor vehicle that an object is located in the surrounding area.

Figure 5:
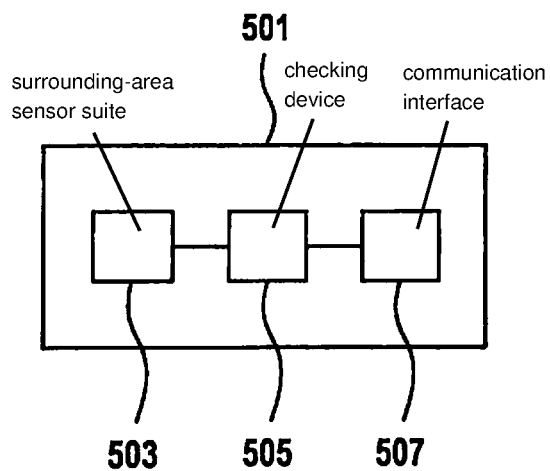
FIG. 5 shows an apparatus for operating a parking facility.

FIG. 5 shows an apparatus 501 for operating a parking facility.

Apparatus 501 encompasses:
  a surrounding-area sensor suite 503 for detecting a surrounding area of a motor vehicle driving driverlessly within the parking facility, in order to ascertain surrounding-area data corresponding to the detected surrounding area;
  a checking device 505 for checking, based on the ascertained surrounding-area data, whether the surrounding area of the motor vehicle is devoid of an object that might, with a predetermined probability, collide with the motor vehicle; and
  a communication interface 507 for transmitting to the motor vehicle, via a communication network, a release signal for a route segment located ahead of the motor vehicle, if the check has indicated that the surrounding area of the motor vehicle is devoid of a corresponding object.

Surrounding-area sensor suite 503 encompasses, for example, one or more surrounding-area sensors.

Figure 6:
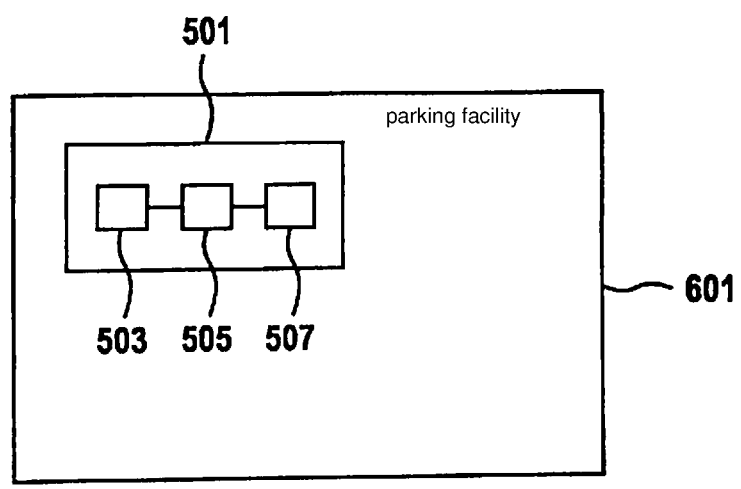
FIG. 6 shows a parking facility for motor vehicles.

FIG. 6 depicts, in symbolically simplified form, a parking facility 601 for motor vehicles.

Parking facility 601 encompasses apparatus 501 in accordance with FIG. 5.

Figure 7:
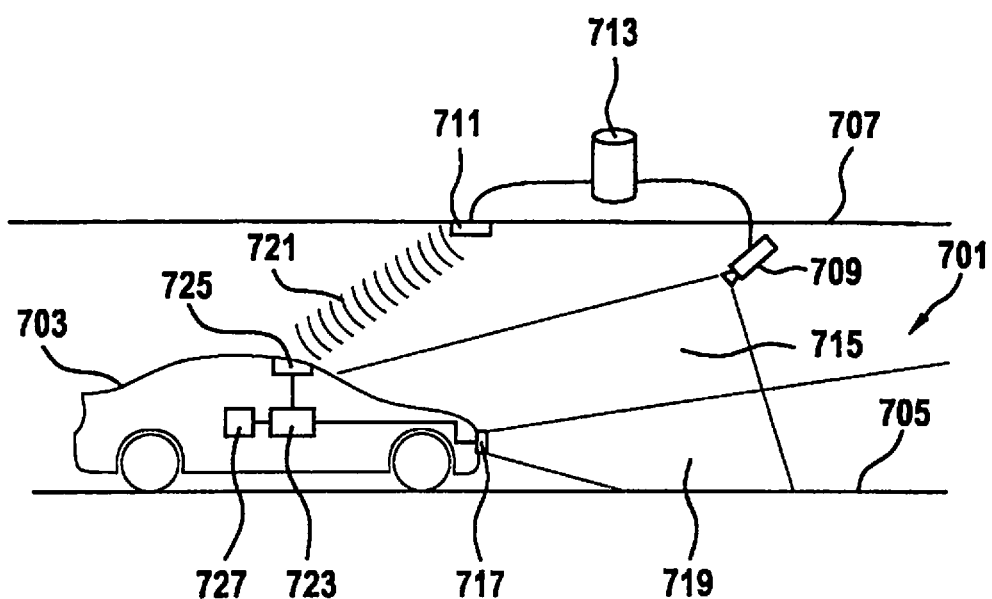
FIG. 7 shows a further parking facility for motor vehicles.

FIG. 7 shows a further parking facility 701 for motor vehicles.

Within parking facility 701, a motor vehicle 703 is driving driverlessly on a road surface 705. A video camera 709 is disposed on a ceiling 707 of parking facility 701. Also disposed on ceiling 707 is a wireless communication interface 711. Video camera 709 and wireless communication interface 711 are connected to a checking device 713. Video camera 709 detects a surrounding area 715 of motor vehicle 703 and conveys surrounding-area data, corresponding to the detected surrounding area 715, to checking device 713. Checking device 713 checks, based on those surrounding-area data, whether surrounding area 715 is devoid of an object that might, with a predetermined probability, collide with motor vehicle 703. If checking device 713 finds that surrounding area 715 is devoid of a corresponding object, checking device 713 generates a release signal for the route segment located ahead of motor vehicle 703, i.e. for surrounding area 715, and conveys that release signal to communication interface 711. The latter then transmits the release signal to motor vehicle 703. The transmission of this signal is labeled symbolically, using graphic elements, with the reference character 721.

In an embodiment that is not shown, further surrounding-area sensors are provided, in addition to or instead of video camera 709, in order to detect the surrounding area. Such surrounding-area sensors are, for example, a laser sensor, ultrasonic sensor, lidar sensor, magnetic sensor, infrared sensor, or radar sensor.

Motor vehicle 703 encompasses a radar sensor 717 that is disposed on the front side of motor vehicle 703. Radar sensor 717 thus detects a front-side surrounding area 719 of motor vehicle 703 and ascertains corresponding surrounding-area data. Those surrounding-area data are conveyed to a checking device 723 of motor vehicle 703. Based on those surrounding-area data, checking device 723 checks whether an object that might, with a predetermined probability, collide with motor vehicle 703 is located in surrounding area 719 of motor vehicle 703. This therefore means that checking device 723 checks vehicle-internally, based on the ascertained surrounding-area data, whether surrounding area 719 is devoid of a corresponding object.

In an embodiment that is not shown, further surrounding-area sensors are provided, in addition to or instead of radar sensor 717, in order to detect the surrounding area. Such surrounding-area sensors are, for example, a laser sensor, ultrasonic sensor, lidar sensor, magnetic sensor, infrared sensor, or video sensor.

Motor vehicle 703 furthermore encompasses a guidance device 727 that is embodied to driverlessly guide motor vehicle 703.

Motor vehicle 703 furthermore encompasses a wireless communication interface 725 that is embodied to receive the release signal that was transmitted by way of communication interface 711.

Checking device 723 furthermore checks whether such a release signal has been received. According to an embodiment, two conditions must exist in order for motor vehicle 703 to continue driving driverlessly:

On the one hand, the motor vehicle-internal check of surrounding area 719 must have indicated that the latter is devoid of an object.

On the other hand, the motor vehicle-external check of surrounding area 715 must have indicated that the latter is devoid of a corresponding object. This therefore means that a release signal must exist in this case.

This therefore means both that motor vehicle 703 itself must have arrived at the decision that the surrounding area is devoid of a corresponding object, and that motor vehicle 703 must additionally have received the release signal. Only when it has been determined or ascertained, both motor vehicle-internally and -externally, that surrounding area 719, 715 of motor vehicle 703 is devoid of a corresponding object, does guidance device 717 continue driverlessly guiding motor vehicle 703.

If, however, only checking device 723 determines, based on the surrounding-area data of radar sensor 717, that surrounding area 719 is devoid of an object but a release signal has not been received, driverless driving of motor vehicle 703 is then halted or stopped. This means that guidance device 727 automatically halts motor vehicle 703.

The invention thus, in particular, furnishes an efficient technical concept that enhances safety for a motor vehicle driving driverlessly within a parking facility and for traffic participants that are located within the parking facility. A basic idea of the present invention is to be regarded in particular as the fact that a release signal is generated, for example actively and for example regularly, and transmitted to the vehicle, if it is found by way of the vehicle-external surrounding-area sensor suite that a surrounding area of the motor vehicle is devoid of an object that might, with a predetermined probability, collide with the motor vehicle. This therefore means, for example, that a parking facility management system that encompasses the apparatus for operating a parking facility checks, using an infrastructure monitoring system (the vehicle-external surrounding-area sensor suite: video cameras, lidar sensors, radar sensors, ultrasonic sensors, magnetic sensors, laser sensors), whether a region ahead of and/or around the motor vehicle is devoid of objects that might, with a predetermined probability, collide with the motor vehicle. If the region or the surrounding area is devoid of such objects, then after each analysis, i.e. after each check, the parking facility management transmits that state, i.e. the fact that the region is unoccupied, for example regularly, to the motor vehicle via a communication network. This therefore means that a release signal is transmitted regularly to the motor vehicle.

A vehicle-internal check likewise takes place in the motor vehicle itself, based in particular on a vehicle-internal surrounding-area sensor suite. This therefore means that a check is made motor vehicle-internally as to whether a surrounding area of the motor vehicle is devoid of a corresponding object.

According to an embodiment, in a subsequent step a check is made as to whether both the vehicle-internal check based on the motor vehicle-internal sensor suite, and the motor vehicle-external check based on the motor vehicle-external surrounding-area sensor suite, have indicated whether the surrounding area is devoid of corresponding objects.

If such is the case, the motor vehicle continues driving driverlessly.

If such is not the case, according to an embodiment the motor vehicle is immediately halted. In another embodiment, firstly a next analysis or the next analyses or checking steps are awaited before halting occurs. This therefore means that a current situation is verified prior to an action, i.e. in this case halting.

In a further embodiment, the absence of an active report of the "devoid" state (i.e., the absence of a release signal) means that, for example for safety reasons, the situation is assumed to be unsafe. "Unsafe" means in particular that for safety's sake it is assumed that an object that might, with a predetermined probability, collide with the motor vehicle is located in the surrounding area of the motor vehicle. This situation can occur, for example, if one of the analyses (in the motor vehicle or in the vehicle-external apparatus) has required sufficient time and/or was erroneously terminated and/or a transfer of the analysis from the parking facility management system to the motor vehicle was not carried out, for example because a WLAN communication network has failed.

In a further embodiment, the transfer of the state can be carried out regularly after two or more analyses (i.e., not after each analysis). This can be useful, for example, if the analyses with regard to the speed of the vehicle are carried out so quickly that it is sufficient not to transfer all the analyses.

In a variant embodiment, the analyses in the vehicle and in the parking facility management system are and/or become time-synchronized.

In an embodiment, provision is made that the analyses in the parking management system and in the vehicle are not carried out in time-synchronized fashion. Because synchronization can be very complex, omitting it means particularly efficient execution of the method. For this reason, in a further embodiment it is always the next concurrent analyses of the vehicle and the parking facility management system that are used.

According to the present invention, therefore, for example
- checking occurs regularly rather than in situation-dependent fashion, and/or
- for example, analysis occurs with reference to devoid status rather than to an object, and/or
- for example, unsafe situations are also included.

An advantage of the present invention is that, for example, greater safety can be ensured.

What is claimed is:

1. A method for operating a motor vehicle driving driverlessly within a parking facility, comprising:
    detecting, using a surrounding-area sensor suite of the motor vehicle, during the driverless driving within the parking facility, a surrounding area of the motor vehicle, to ascertain surrounding-area data corresponding to the detected surrounding area;
    checking, motor vehicle-internally, during the driverless driving and based on the ascertained surrounding-area data, whether the surrounding area of the motor vehicle is devoid of an object that might, with a predetermined probability, collide with the motor vehicle; and
    continuing the driverless driving only when the motor vehicle-internal check has indicated that the surrounding area of the motor vehicle is devoid of the object, so that the motor vehicle automatically halts if the motor vehicle-internal check has indicated that the object is located in the surrounding area,
    additionally checking, motor vehicle-internally, during the driverless driving, whether a release signal for a route segment located ahead of the motor vehicle has been received from a motor vehicle-external checking apparatus of the parking facility via a wireless communication network by way of a wireless communication interface of the motor vehicle, the driverless driving being continued only when the release signal has been received, even if the motor vehicle-internal check has indicated that the surrounding area of the motor vehicle is devoid of the object;
    wherein the driverless driving is continued only when both: (i) the motor vehicle-internal check has indicated that the surrounding area of the motor vehicle is devoid of the object, and (i) the additional motor vehicle-internal check indicates that the release signal has been received;
    wherein the motor vehicle external checking apparatus of the parking facility is external to and completely separate from the motor vehicle.

2. The method as recited in claim 1, wherein the surrounding-area sensor suite of the motor vehicle includes several surrounding-area sensors, detection of the surrounding area including that by way of the several surrounding-area sensors, the respective surrounding area is detected to ascertain surrounding-area data corresponding to the respective detected surrounding area, the motor vehicle-internal check including that, based on the respective ascertained surrounding-area data, a respective check is made motor vehicle-internally as to whether the surrounding area of the motor vehicle is devoid of an object that might, with a predetermined probability, collide with the motor vehicle, driverless driving being continued only when each respective motor vehicle-internal check has indicated that the surrounding area of the motor vehicle is devoid of a corresponding object, so that the motor vehicle automatically halts if at least one respective motor vehicle-internal check has indicated that the object is located in the surrounding area.

3. The method as recited in claim 1, wherein, prior to automatic halting of the motor vehicle, a decision reason that resulted in the automatic halting is verified, so that the motor vehicle automatically halts only upon positive verification.

4. The method as recited in claim 1, wherein the motor vehicle-internal checking is time-synchronized with a motor vehicle-external check as to whether the surrounding area of the motor vehicle is devoid of an object that might, with a predetermined probability, collide with the motor vehicle.

5. An apparatus for operating a motor vehicle driving driverlessly within a parking facility, comprising:
    a surrounding-area sensor suite, situated in and/or on the motor vehicle, configured to detect, during the driverless driving in the parking facility, a surrounding area of the motor vehicle to ascertain surrounding-area data corresponding to the detected surrounding area;
    a checking device, situated in the motor vehicle, configured to motor vehicle-internally check, during the driverless driving and based on the ascertained surrounding-area data, whether the surrounding area of the motor vehicle is devoid of an object that might, with a predetermined probability, collide with the motor vehicle;
    a guidance device, situated in the motor vehicle, configured to driverlessly guide the motor vehicle, the guidance device being embodied to continue the driverless driving only when the check has indicated that the surrounding area of the motor vehicle is devoid of the object, the guidance device being configured to automatically halt the motor vehicle if the check has indicated that the object is located in the surrounding area; and
    a wireless communication interface, situated in the motor vehicle, configured to receive from a motor vehicle-external apparatus of the parking facility via a wireless communication network, a release signal for a route segment located ahead of the motor vehicle, wherein the checking device is configured to additionally motor vehicle-internally check whether a corresponding release signal has been received from the motor vehicle-external apparatus via the wireless communication network by way of the wireless communication interface, the guidance device being configured to continue the driverless driving only when the release signal has been received, even if the check has indicated that the surrounding area of the motor vehicle is devoid of the object;

wherein the guidance device is configured to continue the driverless driving only when both: (i) the motor vehicle-internal check has indicated that the surrounding area of the motor vehicle is devoid of the object, and (i) the additional motor vehicle-internal check indicates that the release signal has been received; and wherein the motor vehicle external checking apparatus of the parking facility is external to and completely separate from the motor vehicle.

6. The apparatus as recited in claim 5, wherein the surrounding-area sensor suite includes several surrounding-area sensors for respectively detecting the surrounding area, to respectively ascertain surrounding-area data corresponding to the respective detected surrounding area, the checking device being embodied to respectively check, based on the respective ascertained surrounding-area data, whether the surrounding area of the motor vehicle is devoid of an object that might, with a predetermined probability, collide with the motor vehicle, the guidance device being embodied to continue driverless driving only when the respective check has indicated that the surrounding area of the motor vehicle is devoid of the object, the guidance device being embodied to automatically halt the motor vehicle if the respective motor vehicle-internal check has indicated that the object is located in the surrounding area.

7. The apparatus as recited in claim 5, wherein the checking device is embodied to verify, prior to automatic halting of the motor vehicle, a decision reason that resulted in the automatic halting, the guidance device being embodied to automatically halt the motor vehicle only upon positive verification.

8. The apparatus as recited in claim 5, wherein the checking device is embodied to time-synchronize the check with a further check by a further checking device as to whether the surrounding area of the motor vehicle is devoid of an object that might, with a predetermined probability, collide with the motor vehicle.

9. A motor vehicle encompassing an apparatus for operating the motor vehicle driving driverlessly within a parking facility, the apparatus including; (i) a surrounding-area sensor suite, situated in the motor vehicle, configured to detect a surrounding area of the motor vehicle to ascertain surrounding-area data corresponding to the detected surrounding area, (ii) a checking device, situated in the motor vehicle, configured to motor vehicle internally check, based on the ascertained surrounding-area data, whether the surrounding area of the motor vehicle is devoid of an object that might, with a predetermined probability, collide with the motor vehicle, (iii) a guidance device, situated in the motor vehicle, configured to driverlessly guide the motor vehicle, the guidance device being configured to continue driverless driving only when the check has indicated that the surrounding area of the motor vehicle is devoid of the object, the guidance device being embodied to automatically halt the motor vehicle if the check has indicated that the object is located in the surrounding area, and (iv) a wireless communication interface, situated in the motor vehicle, configured to receive from a motor vehicle-external apparatus of the parking facility via a wireless communication network, a release signal for a route segment located ahead of the motor vehicle, wherein the checking device is configured to additionally motor vehicle-internally check whether a corresponding release signal has been received from the motor vehicle-external apparatus of the parking facility via the wireless communication network by way of the wireless communication interface, the guidance device being embodied to continue driverless driving only when the release signal has been received, even if the check has indicated that the surrounding area of the motor vehicle is devoid of the object;

wherein the guidance device is configured to continue the driverless driving only when both: (i) the motor vehicle-internal check has indicated that the surrounding area of the motor vehicle is devoid of the object, and (i) the additional motor vehicle-internal check indicates that the release signal has been received; and wherein the motor vehicle external checking apparatus of the parking facility is external to and completely separate from the motor vehicle.

10. A method for operating a parking facility, comprising:

detecting, using a surrounding-area sensor suite of the parking facility, a surrounding area of a motor vehicle driving driverlessly within the parking facility, to ascertain surrounding-area data corresponding to the detected surrounding area, wherein the surrounding-area sensor suite of the parking facility is external to and completely separate from the motor vehicle, and the surrounding-area sensor system suite includes at least one sensor mounted in the parking facility to a structure of the parking facility;

checking using a checking device of the parking facility, based on the ascertained surrounding-area data, whether the surrounding area of the motor vehicle is devoid of an object that might, with a predetermined probability, collide with the motor vehicle, wherein the checking device of the parking facility is external to and completely separate from the motor vehicle; and transmitting to the motor vehicle via a wireless communication network, by way of a wireless communication interface of the parking facility, a release signal for a route segment located ahead of the motor vehicle, based on the check indicating that the surrounding area of the motor vehicle is devoid of the object.

11. The method as recited in claim 10, wherein the checking using the checking device of the parking facility is time-synchronized with a check by a motor vehicle-internal checking device as to whether the surrounding area of the motor vehicle is devoid of an object that might, with a predetermined probability, collide with the motor vehicle.

12. An apparatus for operating a parking facility, comprising:

a surrounding-area sensor suite configured to detect a surrounding area of a motor vehicle driving driverlessly within the parking facility, to ascertain surrounding-area data corresponding to the detected surrounding area, wherein the surrounding-area sensor suite is external to and completely separate from the motor vehicle, and the surrounding-area sensor system suite includes at least one sensor mounted in the parking facility to a structure of the parking facility;

a checking device configured to check, based on the ascertained surrounding-area data, whether the surrounding area of the motor vehicle is devoid of an object that might, with a predetermined probability, collide with the motor vehicle, wherein the checking device is external to and completely separate from the motor vehicle; and a wireless communication interface configured to transmit to the motor vehicle, via a wireless communication network, a release signal for a route segment located ahead of the motor vehicle, based on the check indicating that the surrounding area of the motor vehicle is devoid of the object.

13. The apparatus as recited in claim 12, wherein the checking device is embodied to time-synchronize the check with a check by a motor vehicle-internal checking device as to whether the surrounding area of the motor vehicle is devoid of an object that might, with a predetermined probability, collide with the motor vehicle.

14. A parking system, comprising an apparatus for operating a parking facility, the apparatus including: (i) a surrounding-area sensor suite of the parking facility configured to detect a surrounding area of a motor vehicle driving driverlessly within the parking facility, to ascertain surrounding-area data corresponding to the detected surrounding area, wherein the surrounding-area sensor suite of the parking facility is external to and completely separate from the motor vehicle, and the surrounding-area sensor system suite includes at least one sensor mounted in the parking facility to a structure of the parking facility, (ii) a checking device of the parking facility configured to check, based on the ascertained surrounding-area data, whether the surrounding area of the motor vehicle is devoid of an object that might, with a predetermined probability, collide with the motor vehicle, wherein the checking device of the parking facility is external to and completely separate from the motor vehicle, (iii) a wireless communication interface of the parking facility configured to transmit to the motor vehicle, via a wireless communication network, a release signal for a route segment located ahead of the motor vehicle, based on the check indicating that the surrounding area of the motor vehicle is devoid of the object.

15. A non-transitory computer-readable storage medium on which is stored a computer program including program code for operating a parking facility, the computer program, when executed by a computer, causing the computer to perform:

detecting, using a surrounding-area sensor suite of the parking facility, a surrounding area of a motor vehicle driving driverlessly within the parking facility, to ascertain surrounding-area data corresponding to the detected surrounding area, wherein the surrounding-area sensor suite is external to and completely separate from the motor vehicle, and the surrounding-area sensor system suite includes at least one sensor mounted in the parking facility to a structure of the parking facility;

checking using a checking device of the parking facility, based on the ascertained surrounding-area data, whether the surrounding area of the motor vehicle is devoid of an object that might, with a predetermined probability, collide with the motor vehicle, wherein the checking device of the parking facility is external to and completely separate from the motor vehicle; and transmitting to the motor vehicle via a wireless communication network, by way of a wireless communication interface of the parking facility, a release signal for a route segment located ahead of the motor vehicle, based on the check indicating that the surrounding area of the motor vehicle is devoid of the object.

16. The method as recited in claim 1, wherein the driverless driving is automatically halted when either: (ii) the motor vehicle-internal check has indicated that the object is located in the surrounding area, or (ii) the additional motor vehicle-internal check indicates that the release signal has not been received.

17. The apparatus as recited in claim 5, wherein the guidance device is configured to halt the driverless driving when either: (ii) the motor vehicle-internal check has indicated that the object is located in the surrounding area, or (ii) the additional motor vehicle-internal check indicates that the release signal has not been received.

18. The motor vehicle as recited in claim 9, wherein the guidance device is configured to halt the driverless driving when either: (ii) the motor vehicle-internal check has indicated that the object is located in the surrounding area, or (ii) the additional motor vehicle-internal check indicates that the release signal has not been received.

19. The method as recited in claim 10, further comprising the following steps:

detecting, using a surrounding-area sensor suite of the motor vehicle, during the driverless driving within the parking facility, the surrounding area of the motor vehicle, to ascertain additional surrounding-area data corresponding to the surrounding area detected by the surrounding-area sensor suite of the motor vehicle;

checking, motor vehicle-internally, during the driverless driving and based on the ascertained additional surrounding-area data, whether the surrounding area of the motor vehicle is devoid of objects that might, with a predetermined probability, collide with the motor vehicle; and continuing the driverless driving only when the motor vehicle-internal check has indicated that the surrounding area of the motor vehicle is devoid of the objects, so that the motor vehicle automatically halts if the motor vehicle-internal check has indicated that one or more objects is located in the surrounding area;

additionally checking, motor vehicle-internally, during the driverless driving, whether the release signal for the route segment located ahead of the motor vehicle has been received from the parking facility via the wireless communication network by way of a wireless communication interface of the motor vehicle, the driverless driving being continued only when the release signal has been received, even if the motor vehicle-internal check has indicated that the surrounding area of the motor vehicle is devoid of the objects;

wherein the driverless driving is continued only when both: (i) the motor vehicle-internal check has indicated that the surrounding area of the motor vehicle is devoid of the objects, and (i) the additional motor vehicle-internal check indicates that the release signal has been received; and wherein the motor vehicle external checking apparatus of the parking facility is external to and completely separate from the motor vehicle.

20. The method as recited in claim 19, wherein the driverless driving is automatically halted when either: (ii) the motor vehicle-internal check has indicated that one or more objects are located in the surrounding area, or (ii) the additional motor vehicle-internal check indicates that the release signal has not been received.

21. The parking system as recited in claim 14, further comprising:

an apparatus for operating the motor vehicle driving driverlessly within the parking facility, the apparatus including:

- a surrounding-area sensor suite situated in the motor vehicle configured to detect, during the driverless driving in the parking facility, the surrounding area of the motor vehicle to ascertain further surrounding-area data corresponding to the surrounding area detected by the surrounding-area sensor suite situated in the motor vehicle;
- a checking device situated in the motor vehicle configured to check, during the driverless driving and based on the ascertained further surrounding-area data, whether the surrounding area of the motor vehicle is devoid of objects that might, with another predetermined probability, collide with the motor vehicle;
- a guidance device situated in the motor vehicle to driverlessly guide the motor vehicle, the guidance device being embodied to continue the driverless driving only when the check by the checking device situated in the motor vehicle has indicated that the surrounding area of the motor vehicle is devoid of the objects, the guidance device being configured to automatically halt the motor vehicle if the check has indicated that one or more objects is located in the surrounding area; and
- a wireless communication interface situated in the motor vehicle configured to receive from the apparatus for operating the parking facility via the wireless communication network, the release signal for the route segment located ahead of the motor vehicle, wherein the checking device situated in the motor vehicle is configured to additionally check whether the release signal has been received from the motor vehicle-external apparatus via the wireless communication network by way of the wireless communication interface situated in the motor vehicle, the guidance device being configured to continue the driverless driving only when the release signal has been received, even if the check by the checking device situated in the motor vehicle has indicated that the surrounding area of the motor vehicle is devoid of the objects;
- wherein the guidance device is configured to continue the driverless driving only when both: (i) the motor vehicle-internal check has indicated that the surrounding area of the motor vehicle is devoid of the object, and (i) the additional motor vehicle-internal check indicates that the release signal has been received; and
- wherein the motor vehicle external checking apparatus of the parking facility is external to and completely separate from the motor vehicle.

22. The parking system as recited in claim 21, wherein the guidance device is configured to halt the driverless driving when either: (ii) the motor vehicle-internal check has indicated that the corresponding object is located in the surrounding area, or (ii) the additional motor vehicle-internal check indicates that the release signal has not been received.

23. The method as recited in claim 1, wherein the motor vehicle-external apparatus of the parking facility transmits, via the wireless communication network, the release signal for the route segment located ahead of the motor vehicle via the wireless network, based on motor vehicle-externally determining, using at least one sensor mounted on a structure of the parking facility, that the surrounding area is devoid of objects that might, with another predetermined probability, collide with the motor vehicle.

* * * * *